(12) United States Patent
Kishimoto

(10) Patent No.: US 12,449,855 B2
(45) Date of Patent: Oct. 21, 2025

(54) ANTI-CORROSION AND WATERPROOFING STRUCTURE AND DISPLAY DEVICE HAVING THE SAME

(71) Applicant: Samsung Display Co., Ltd., Yongin-si (KR)

(72) Inventor: Hirotsugu Kishimoto, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 226 days.

(21) Appl. No.: 18/330,671

(22) Filed: Jun. 7, 2023

(65) Prior Publication Data
US 2024/0085954 A1 Mar. 14, 2024

(30) Foreign Application Priority Data
Sep. 13, 2022 (KR) .................. 10-2022-0114895

(51) Int. Cl.
*G06F 1/16* (2006.01)
*G02B 1/14* (2015.01)
*H04M 1/02* (2006.01)

(52) U.S. Cl.
CPC .......... *G06F 1/1652* (2013.01); *G06F 1/1616* (2013.01); *G06F 1/1656* (2013.01); *G02B 1/14* (2015.01); *H04M 1/0216* (2013.01); *H04M 1/0268* (2013.01)

(58) Field of Classification Search
CPC .... G06F 1/1652; G06F 1/1616; G06F 1/1656; G06F 1/1637; G06F 1/1681; G02B 1/14; H04M 1/0216; H04M 1/0268; G09F 9/301; G09F 9/33; G09F 9/335; H10K 50/84; H10K 77/111; H10K 2102/311
See application file for complete search history.

(56) References Cited

U.S. PATENT DOCUMENTS

| | | | | |
|---|---|---|---|---|
| 11,216,029 B2 * | 1/2022 | Yoo | ................... | H04M 1/0268 |
| 11,304,315 B2 * | 4/2022 | Kim | ................... | H05K 5/03 |
| 11,406,044 B2 * | 8/2022 | Wu | ................... | G06F 1/1616 |
| 11,579,654 B2 * | 2/2023 | Mizoguchi | ........... | G06F 1/1641 |
| 11,797,047 B2 * | 10/2023 | Yoo | ................... | G06F 1/1652 |
| 11,846,985 B2 * | 12/2023 | Min | ................... | G06F 1/1656 |
| 11,985,770 B2 * | 5/2024 | Chen | ................... | G06F 1/1652 |

(Continued)

OTHER PUBLICATIONS https://www.youtube.com/watch?v=7G62pp8gstQ, "Samsung Z Flip 3 Teardown!—Let's try something new . . . " by JerryRigEverything.

*Primary Examiner* — Rockshana D Chowdhury
(74) *Attorney, Agent, or Firm* — CANTOR COLBURN LLP

(57) ABSTRACT

A display device includes a display panel including a folding region and a non-folding region which is adjacent to the folding region along a first direction, a first plate facing the display panel, a second plate facing the non-folding region of the display panel with the first plate therebetween, the second plate including a first sub-plate and a second sub-plate spaced apart from each other along the first direction, at the folding region, and each of the first sub-plate and the second sub-plate including an outer edge, and an adhesive layer protruded from the second plate, in a direction away from the first plate. The adhesive layer includes a first sub-adhesive layer extended along the outer edge of the first sub-plate, and a second sub-adhesive layer extended along the outer edge of the second sub-plate.

27 Claims, 13 Drawing Sheets

(56) References Cited

U.S. PATENT DOCUMENTS

| | | | | |
|---|---|---|---|---|
| 12,087,187 B2* | 9/2024 | Afsar | ...................... | G09F 9/301 |
| 2018/0096635 A1* | 4/2018 | Park | ...................... | G09F 9/301 |
| 2018/0097197 A1* | 4/2018 | Han | ...................... | G06F 1/1626 |
| 2019/0346887 A1* | 11/2019 | Park | ...................... | G06F 1/1652 |
| 2020/0051881 A1* | 2/2020 | Park | ...................... | B32B 27/06 |
| 2020/0209998 A1* | 7/2020 | Shin | .................... | H04M 1/0268 |
| 2020/0225699 A1* | 7/2020 | Yu | ...................... | G06F 1/1652 |
| 2021/0174711 A1* | 6/2021 | Cho | ...................... | H10K 59/10 |
| 2022/0159845 A1* | 5/2022 | Feng | .................... | H05K 5/0226 |
| 2022/0167509 A1* | 5/2022 | Wu | ...................... | H10K 77/111 |
| 2023/0171901 A1* | 6/2023 | Chen | ...................... | G06F 1/1652 |
| | | | | 361/807 |
| 2023/0200110 A1* | 6/2023 | Oh | ...................... | H10K 59/87 |
| | | | | 257/40 |
| 2023/0315154 A1* | 10/2023 | Manea | .................. | G06F 1/1641 |
| | | | | 345/173 |
| 2024/0085954 A1* | 3/2024 | Kishimoto | ............ | G06F 1/1616 |
| 2024/0164194 A1* | 5/2024 | Han | ...................... | H10K 59/875 |
| 2024/0357902 A1* | 10/2024 | Zhang | ...................... | G09F 9/30 |

\* cited by examiner

ANTI-CORROSION AND WATERPROOFING STRUCTURE AND DISPLAY DEVICE HAVING THE SAME

This application claims priority to Korean Patent Application No. 10-2022-0114895, filed on Sep. 13, 2022, and all the benefits accruing therefrom under 35 U.S.C. § 119, the entire contents of which are hereby incorporated by reference.

BACKGROUND

(1) Field

The present disclosure herein relates to a display device, and more particularly, to a foldable display device.

(2) Description of the Related Art

A display device includes an active region activated in response to an electrical signal. The display device may detect an input externally applied through the active region, and also display various images to provide a user with information through the active region. As display devices having various shapes have been developed, active regions having various shapes are being implemented.

SUMMARY

The present disclosure provides a display device with improved folding property.

An embodiment of the invention provides a display device, which includes a display panel including a first non-folding region, a folding region, and a second non-folding region that are arranged in sequence along a first direction, a first plate disposed below the display panel, a second plate disposed below the first plate and including a first sub-plate overlapping the first non-folding region and a second sub-plate overlapping the second non-folding region on a plane, and an adhesive layer disposed on a bottom surface of the second plate. The adhesive layer includes a first sub-adhesive layer disposed on an edge of the first sub-plate, and a second sub-adhesive layer disposed on an edge of the second sub-plate.

In an embodiment, the first sub-adhesive layer and the second sub-adhesive layer may each have a closed curve shape.

In an embodiment, the adhesive layer may include at least one of an acrylic resin, a urethane-based resin and a silicone resin.

In an embodiment, the second plate may include at least one of Al, Mg and Ti.

In an embodiment, the first sub-plate and the second sub-plate may be spaced a first width from each other in the first direction.

In an embodiment, the first width may be smaller than a width of the folding region in the first direction.

In an embodiment, the first plate may include a pattern overlapping the folding region on a plane.

In an embodiment, the display device may further include a lower adhesive layer disposed between the first plate and the second plate, and an opening portion overlapping the folding region on a plane may be defined in the lower adhesive layer.

In an embodiment, the display device may further include a high restoration layer including an elastomer and disposed between the first plate and the lower adhesive layer.

In an embodiment, the lower adhesive layer may be in contact with a top surface of the first sub-plate and a top surface of the second sub-plate.

In an embodiment, the top surface of the first sub-plate may include a first exposed surface exposed by the opening portion, and the top surface of the second sub-plate may include a second exposed surface exposed by the opening portion.

In an embodiment, the display device may further include an anti-corrosion layer that covers the first exposed surface and the second exposed surface.

In an embodiment, the first sub-plate may have a first inner side surface, the second sub-plate may have a second inner side surface facing the first inner side surface, and the anti-corrosion layer may extend so as to cover the first inner side surface and the second inner side surface.

In an embodiment, the display device may further include a set member disposed below the second plate, and the adhesive layer may be in contact with a top surface of the set member.

In an embodiment of the invention, a display device includes a display panel including a first non-folding region, a folding region, and a second non-folding region that are arranged in sequence along a first direction, a first plate disposed below the display panel, a second plate in which a through-hole overlapping the folding region on a plane is defined and which is disposed below the first plate, a lower film having a bottom surface, in which a groove overlapping the folding region on a plane is defined, and disposed between the first plate and the second plate, and an anti-corrosion layer disposed between the second plate and the lower film. The lower film is in contact with a top surface of the second plate, and the anti-corrosion layer covers the top surface of the second plate, which is exposed by the groove.

In an embodiment, the through-hole may have a first width in the first direction, and the groove may have a second width greater than the first width in the first direction.

In an embodiment, a pattern overlapping the folding region on a plane may be defined in the first plate.

In an embodiment, the lower film may couple the first plate and the second plate to each other.

In an embodiment, the lower film may include a first lower adhesive layer in contact with a bottom surface of the first plate, a second lower adhesive layer which is in contact with a top surface of the second plate and in which the groove is defined, and a high restoration layer including an elastomer and disposed between the first lower adhesive layer and the second lower adhesive layer.

In an embodiment, the display device may further include an adhesive layer in contact with a bottom surface of the second plate, and the adhesive layer may be disposed on an edge of the second plate.

In an embodiment, the second plate may include a first sub-plate overlapping the first non-folding region, and a second sub-plate overlapping the second non-folding region on a plane. The first sub-plate and the second sub-plate may be spaced apart from each other in the first direction with the through-hole therebetween. The adhesive layer may include a first sub-adhesive layer disposed in a closed curve shape along an edge of the first sub-plate, and a second sub-adhesive layer disposed in a closed curve shape along an edge of the second sub-plate.

In an embodiment, the first sub-plate may have a first inner side surface in which the through-hole is defined, and the second sub-plate may have a second inner side surface in which the through-hole is defined and which faces the first inner side surface. The anti-corrosion layer may further cover the first inner side surface and the second inner side surface.

In an embodiment, the adhesive layer may include at least one of an acrylic resin, a urethane-based resin and a silicone resin.

In an embodiment, the second plate may include at least one of Al, Mg and Ti.

In an embodiment of the invention, a display device includes a display panel including a folding region, a first plate in which a pattern overlapping the folding region on a plane is defined and which is disposed below the display panel, a second plate disposed below the first plate and having an inner side surface in which a through-hole overlapping the folding region on a plane is defined, and an adhesive layer disposed on a bottom surface of the second plate. The adhesive layer is disposed along an edge of the second plate.

In an embodiment, an anti-corrosion layer may be disposed on each of at least a portion of a top surface of the second plate and the inner side surface, and the anti-corrosion layer may not be disposed on the bottom surface of the second plate.

In an embodiment, the second plate may include at least one of Al, Mg and Ti.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1A:
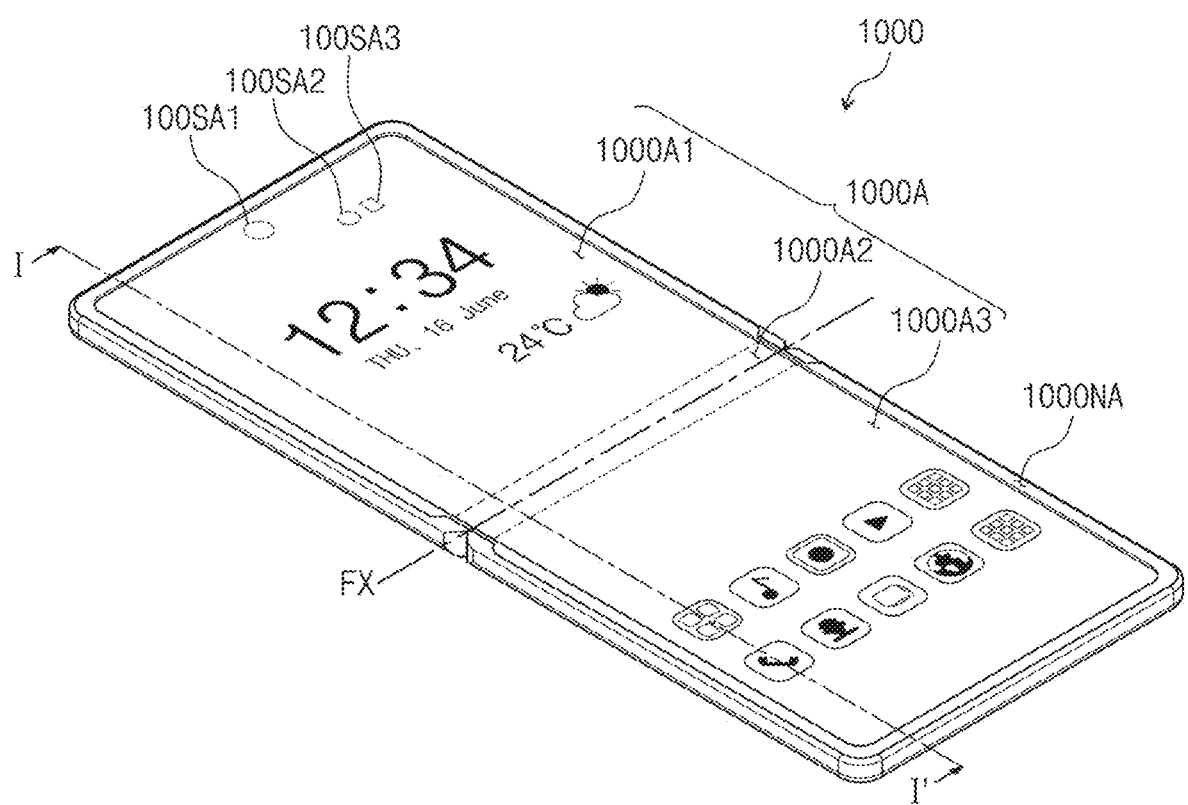
FIG. 1A is a perspective view of a display device according to an embodiment of the invention.
Figure 1A:
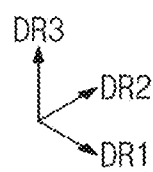

Hereinafter, embodiments of the invention will be described with reference to the accompanying drawings.

It will be understood that when an element (or region, layer, section, etc.) is referred to as being related to another element such as being "on", "connected to" or "coupled to" another element, it can be disposed directly on, connected or coupled to the other element or a third intervening element may be disposed between the elements.

Like reference numbers or symbols refer to like elements throughout. In addition, in the drawings, the thickness, the ratio, and the dimension of elements are exaggerated for effective description of the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations which may be defined by relevant elements.

It will be understood that, although the terms first, second, etc. may be used herein to describe various elements, these elements should not be limited by these terms. These terms are only used to distinguish one element from another element. For example, a first element could be termed a second element without departing from the teachings of the present invention, and similarly, a second element could be termed a first element.

As used herein, the singular forms are intended to include the plural forms as well, unless the context clearly indicates otherwise. For example, a reference number labeling a singular form of an element within the figures may be used to reference a plurality of the singular element within the text of the disclosure.

In addition, the terms, such as "below", "beneath", "on" and "above", are used for explaining the relation of elements shown in the drawings. The terms are relative concepts and are explained based on the direction shown in the drawing.

It will be further understood that the terms such as "comprises," "includes" or "has", when used herein, specify the presence of stated features, numerals, steps, operations, elements, parts, or the combination thereof, but do not preclude the presence or addition of one or more other features, numerals, steps, operations, elements, parts, or the combination thereof.

In the present disclosure, the phrase "being directly disposed" may mean that there is no additional layer, film, region, substrate or the like between a part such as a layer, film, region or substrate, and another part. For example, the phrase "being directly disposed" may mean that two layers or two members are disposed with no additional or intervening member such as an adhesive member, used therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

Figure 1B:
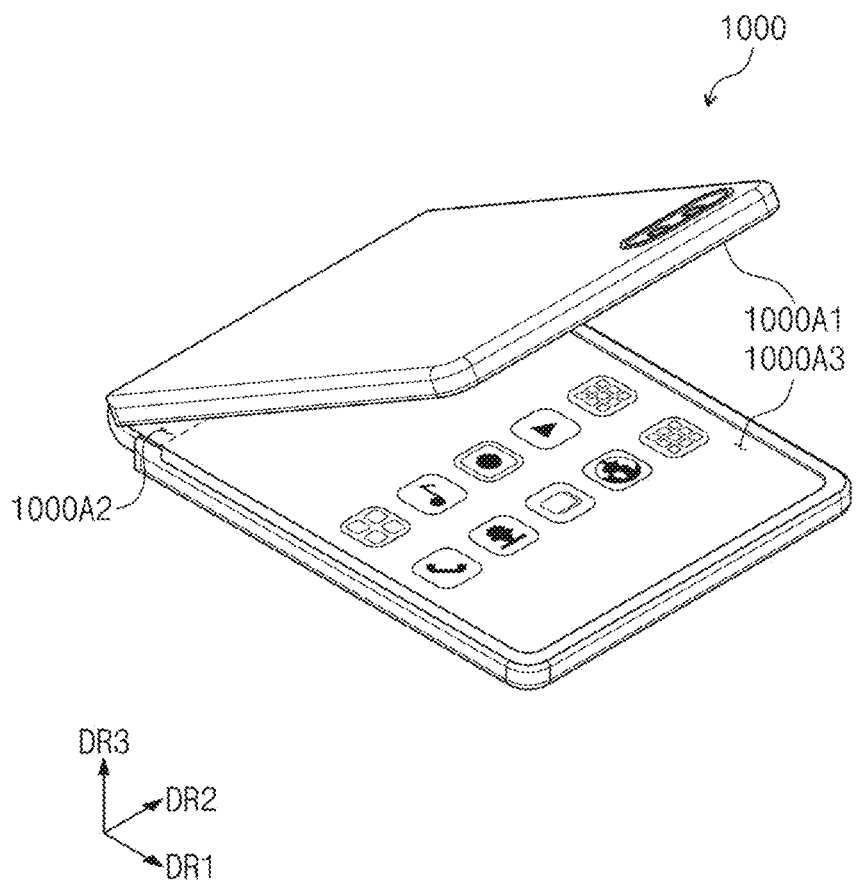
FIG. 1B is a perspective view of a display device according to an embodiment of the invention.

FIG. 1A is a perspective view of a display device 1000 according to an embodiment of the invention. FIG. 1B is a perspective view of a display device 1000 according to an embodiment of the invention. FIG. 1A illustrates a state in which the display device 1000 is unfolded, and FIG. 1B illustrates a state in which the display device 1000 is folded.

Referring to FIGS. 1A and 1B, the display device 1000 may be a device activated in response to an electrical signal. For examples, the display device 1000 may be a mobile phone, a tablet computer, a vehicle navigation device, a game console or a wearable device, but is not limited thereto. FIG. 1A illustrates a mobile phone as an example of the display device 1000.

The display device 1000 may display an image through an active region 1000A. An area (e.g., a planar area) at which an image is displayed may be hereinafter referred to as a display area. In a state in which the display device 1000 is unfolded, the active region 1000A may be disposed in a plane defined by a first direction DR1 and a second direction DR2 crossing each other. A thickness direction of the display device 1000 may be parallel to a third direction DR3 crossing both the first direction DR1 and the second direction DR2. A front surface (or top surface) and a rear surface (or bottom surface) of each of members constituting the display device 1000 may be defined based on the third direction DR3. The term "on a plane" used herein may be defined as being seen or a view in or along the third direction DR3. The term "overlap" used herein means overlapping "on a plane" or "in the third direction DR3" unless particularly defined.

The active region 1000A may include a first region 1000A1, a second region 1000A2, and a third region 1000A3. The second region 1000A2 may be folded with respect to a folding axis FX extending along the second direction DR2, such that the display device 1000 is foldable at the second region 1000A2. The first region 1000A1 and the third region 1000A3 may be referred to as non-folding regions, and the second region 1000A2 may be referred to as a folding region.

In the display device 1000 is folded, the first region 1000A1 and the third region 1000A3 may face each other. In a completely folded state, the active region 1000A may not be exposed to the outside, and this may be referred to as in-folding. However, this is just an example, and an operation of the display device 1000 is not limited thereto.

For example, in an embodiment of the invention, the first region 1000A1 and the third region 1000A3 may oppose each other in the display device 1000 is folded. Here, the active region 1000A may be exposed to the outside, and this may be referred to as out-folding.

The display device 1000 may perform at least one of an in-folding operation and an out-folding operation. For example, as illustrated in FIG. 1B, the display device 1000 according to an embodiment may be in-folded. However, an embodiment of the invention is not limited thereto, and one partial region of the display device 1000 may be in-folded and another partial region may be out-folded.

In FIGS. 1A and 1B, one folding region and a non-folding region provided in plural including two non-folding regions are illustrated as an example. However, the number of each of the folding region and the non-folding region is not limited thereto. For example, the display device 1000 may include three or more non-folding regions and a plurality of folding regions respectively disposed between adjacent non-folding regions.

FIGS. 1A and 1B exemplarily illustrate that the folding axis FX extends in a minor axis direction of the display device 1000, e.g., in the second direction DR2. However, an embodiment of the invention is not limited thereto. For example, the folding axis FX may extend in a major axis direction of the display device 1000, e.g., in the first direction DR1. In this case, the first region 1000A1, the second region 1000A2, and the third region 1000A3 may be arranged in sequence in (or along) the second direction DR2.

The display device 1000 may include a sensing region provided in plural including a plurality of sensing regions 100SA1, 100SA2 and 100SA3. In FIG. 1A, three sensing regions 100SA1, 100SA2 and 100SA3 are illustrated as an example. However, the number of the plurality of sensing regions 100SA1, 100SA2 and 100SA3 is not limited thereto.

In an embodiment, the plurality of sensing regions 100SA1, 100SA2 and 100SA3 may include a first sensing region 100SA1, a second sensing region 100SA2, and a third sensing region 100SA3. The plurality of sensing regions 100SA1, 100SA2 and 100SA3 may respectively overlap a plurality of electronic modules included in the display device 1000. An electronic module may provide a function to the display device 1000 by using light, sound, contact, proximity, etc. as input from outside the display device 1000 (e.g., an external input) or as output provided to outside the display device 1000. For example, the first sensing region 100SA1 may overlap a camera module, and the second sensing region 100SA2 and the third sensing region 100SA3 may overlap a proximity illuminance sensor. However, an embodiment of the invention is not limited thereto.

Each of the plurality of electronic modules may receive an external input delivered through the first sensing region 100SA1, the second sensing region 100SA2, or the third sensing region 100SA3, or provide an output through the first sensing region 100SA1, the second sensing region 100SA2, or the third sensing region 100SA3.

The active region 1000A may include the first sensing region 100SA1, the second sensing region 100SA2, and the third sensing region 100SA3. That is, the first sensing region 100SA1, the second sensing region 100SA2, and the third sensing region 100SA3 may display an image and be a portion of a display area. The first sensing region 100SA1, the second sensing region 100SA2, and the third sensing region 100SA3 may each have transmittance higher than that of the active region 1000A. The transmittance of the first sensing region 100SA1 may be higher than that of each of the second sensing region 100SA2 and the third sensing region 100SA3. As used herein, transmittance may refer to a light transmittance, a sound transmittance, etc. However, an embodiment of the invention is not limited thereto, and at least one of the first sensing region 100SA1, the second sensing region 100SA2 and the third sensing region 100SA3 may be provided in a peripheral region 1000NA, not in the active region 1000A. The peripheral region 1000NA may not display an image and may be otherwise referred to as a non-display area.

An opening portion may be defined in at least one of the first sensing region 100SA1, the second sensing region 100SA2 and the third sensing region 100SA3.

According to an embodiment of the invention, the plurality of electronic modules may overlap the active region 1000A to form a part of the planar area of the active region 1000A, or may be surrounded by the active region 1000A to be a planar area except for the active region 1000A. Thus, the plurality of electronic modules may not be disposed in the peripheral region 1000NA, and an area ratio of the active region 1000A to a front surface of the display device 1000 may increase. Various components or layers of the display device 1000 may include an active region 1000A, a peripheral region 1000NA, a sensing region, etc. respectively corresponding to those described above. Various components or layers of the display device 1000 may be bendable, foldable, rollable, etc. together with each other.

Figure 2:
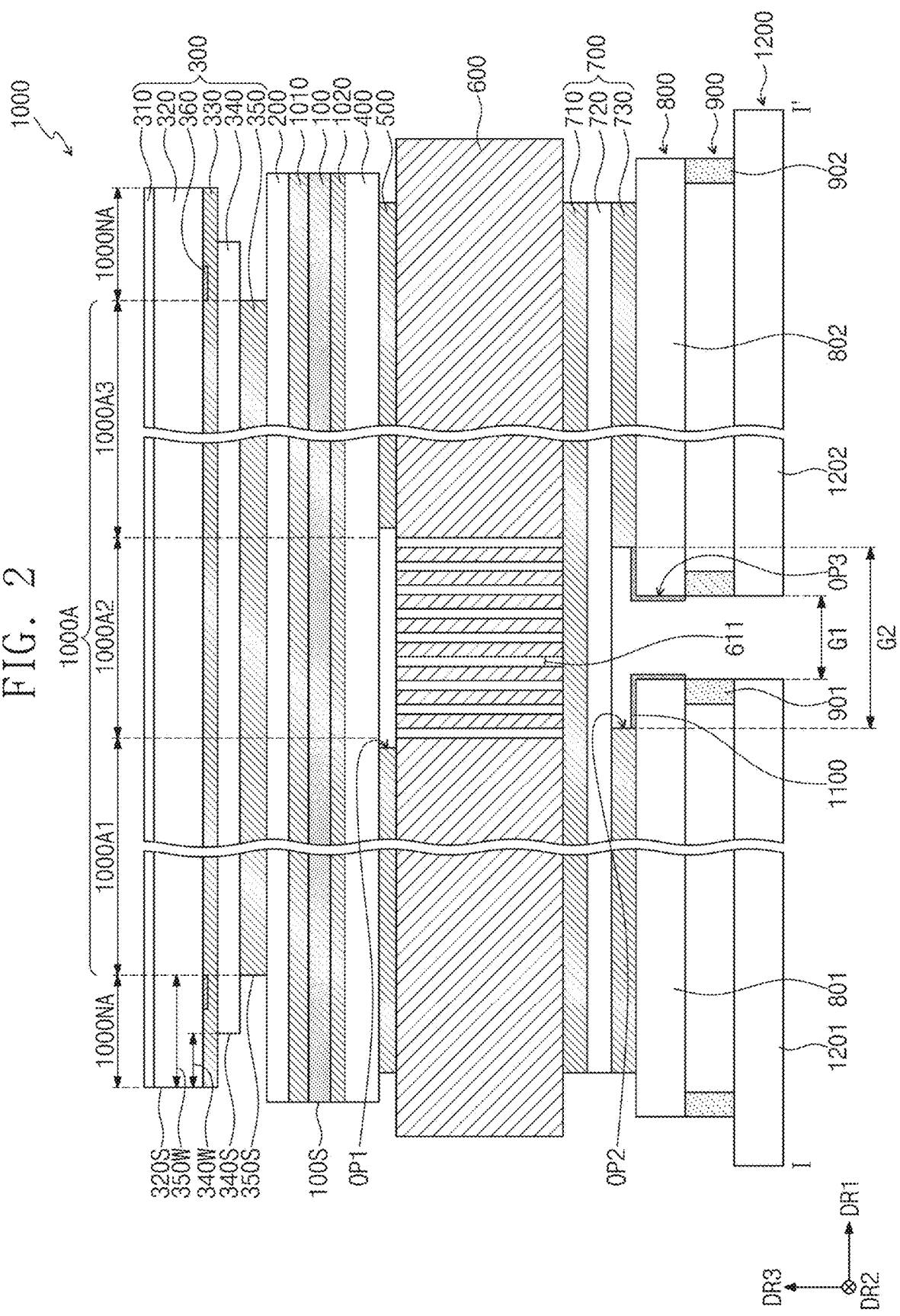
FIG. 2 is a cross-sectional view of a display device according to an embodiment of the invention.
Figure 3:
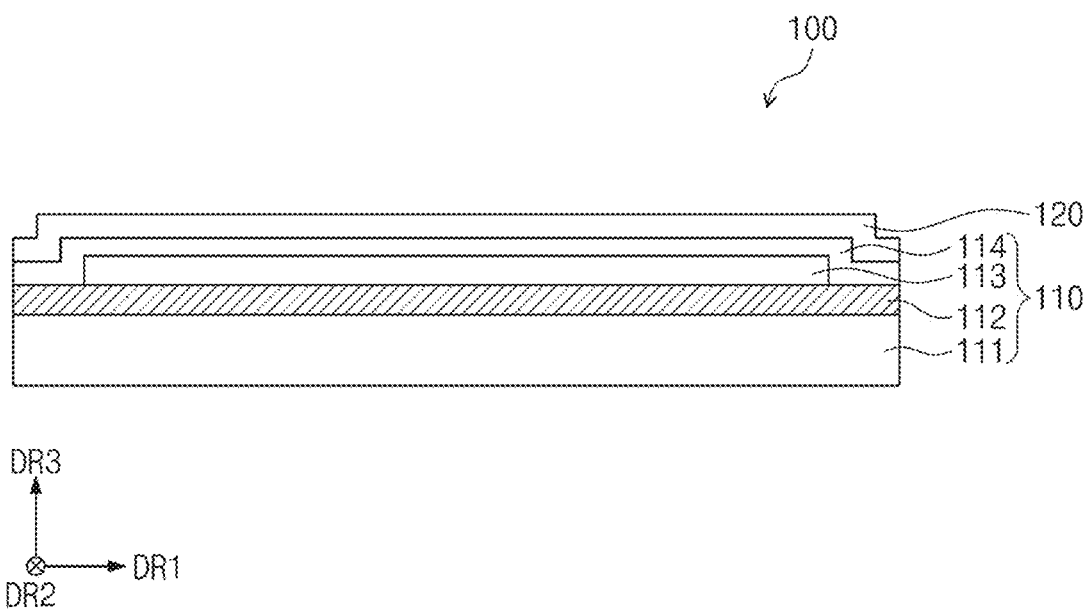
FIG. 3 is a cross-sectional view of a display panel according to an embodiment of the invention.
Figure 4A:
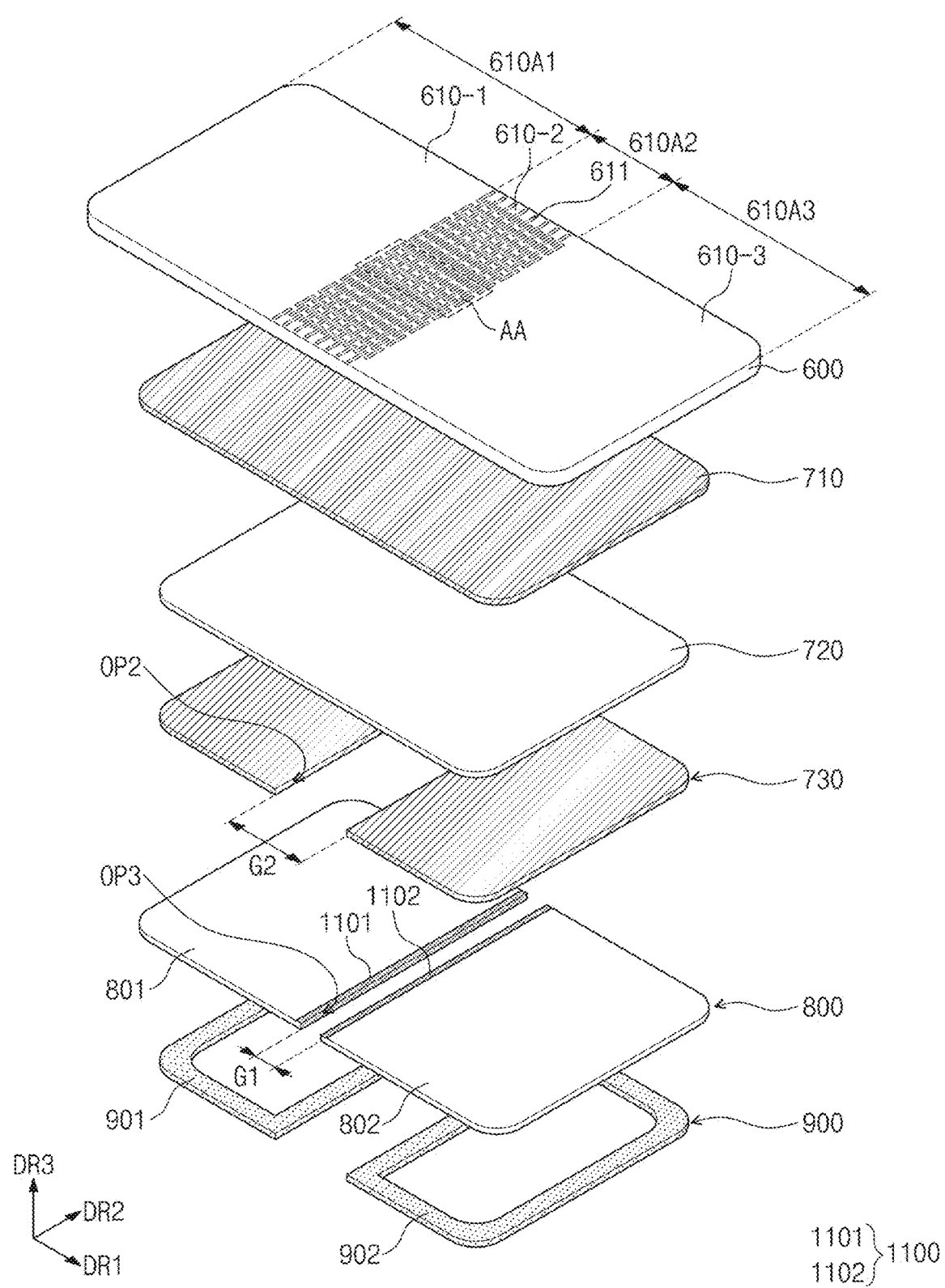
FIG. 4A is an exploded perspective view of some components included in a display device according to an embodiment of the invention.
Figure 4B:
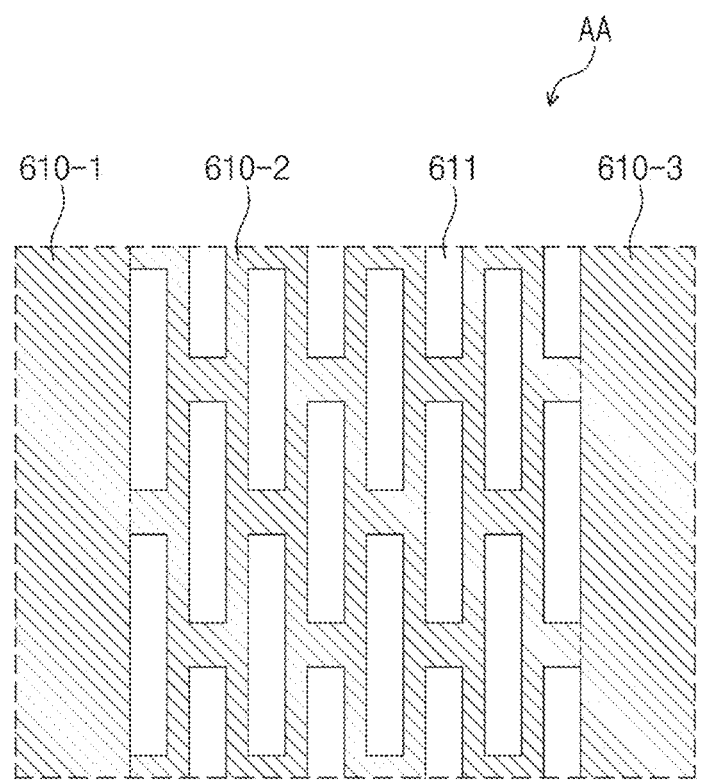
FIG. 4B is an enlarged plan view of area AA illustrated in FIG. 4A according to an embodiment.

FIG. 2 is a cross-sectional view of a display device 1000 according to an embodiment of the invention. FIG. 3 is a cross-sectional view of a display panel 100 according to an embodiment of the invention. FIG. 4A is an exploded perspective view of some components included in a display device according to an embodiment of the invention. FIG. 4B is an exploded plan view of area AA illustrated in FIG. 4A according to an embodiment.

FIG. 2 is a cross-sectional view of a display device 1000 taken along line I-I' in FIG. 1A.

Referring to FIG. 2, the display device 1000 according to an embodiment may include the display panel 100, upper functional layers, and lower functional layers.

Referring to FIG. 3, the display panel 100 may be a component that generates an image and detects an input applied from the outside (e.g., outside of the display device 1000 and/or the display panel 100). For example, the display panel 100 may include a display layer 110 as an image display layer and a sensor layer 120 as a sensing layer.

The display layer 110 may be a component that substantially generates the image. The display layer 110 may be a light emitting display layer including a display element such as a light emitting element. For example, the display layer 110 may be an organic light emitting display layer, a quantum dot display layer, or a micro light emitting diode (LED) display layer.

The display layer 110 may include a base layer 111, a circuit layer 112, a light emitting element layer 113, and an encapsulation layer 114.

The base layer 111 may include a synthetic resin film. The synthetic resin film may include a thermoset resin. The base layer 111 may have a multilayer structure. For example, the base layer 111 may have a three-layer structure of a synthetic resin layer, an adhesive layer, and a synthetic resin layer. In particular, the synthetic resin layer may be a polyimide-based resin layer, and the material thereof is not particularly limited. The synthetic resin layer may include at least one of an acryl-based resin, a methacryl-based resin, polyisoprene, a vinyl-based resin, an epoxy-based resin, a urethane-based resin, a cellulose-based resin, a siloxane-based resin, a polyamide-based resin and a perylene-based resin. In addition, the base layer 111 may include a glass substrate, an organic/inorganic composite material substrate, or the like.

The circuit layer 112 may be disposed on the base layer 111. The circuit layer 112 may include an insulation layer, a semiconductor pattern, a conductive pattern, a signal line, etc. The insulation layer, a semiconductor layer, and a conductive layer may be formed on the base layer 111 through coating, deposition or the like, and then, the insulation layer, the semiconductor layer, and the conductive layer may be selectively patterned by performing a photolithography process multiple times. Thereafter, the semiconductor pattern, the conductive pattern, and a signal line, which are included in the circuit layer 112, may be formed.

The light emitting element layer 113 may be disposed on the circuit layer 112. The light emitting element layer 113 may be connected to the circuit layer 112 for driving (or controlling) the light emitting element layer 113 to emit light, display an image, etc. The light emitting element layer 113 may include a light emitting element which generates and/or emits light. For example, the light emitting element layer 113 may include an organic light emitting material, a quantum dot, a quantum rod, or a micro LED within a light emitting element.

The encapsulation layer 114 may be disposed on the light emitting element layer 113. The encapsulation layer 114 may include an inorganic layer, an organic layer, and an inorganic layer that are stacked in sequence, but the layers constituting the encapsulation layer 114 are not limited thereto. The inorganic layers may protect the light emitting element layer 113 from moisture and oxygen, and the organic layer may protect the light emitting element layer 113 from foreign matters such as dust particles. The inorganic layers may include a silicon nitride layer, a silicon oxynitride layer, a silicon oxide layer, a titanium oxide layer, an aluminum oxide layer, or the like. The organic layer may include an acrylic organic layer, and is not limited thereto.

The sensor layer 120 may be disposed on the display layer 110. The sensor layer 120 may detect an external input applied from the outside. The external input may be an input from an input tool and/or a user, as a user's input. The user's input may include various types of external inputs such as contact, light, heat, pressure, proximity, etc. applied by an input tool such as a body part, a pen, etc.

The sensor layer 120 may be formed on the display layer 110 through a continuous process. For example, the sensor layer 120 may be disposed directly on the display layer 110. In the present disclosure, "being directly disposed" may mean that a third component is not disposed between the sensor layer 120 and the display layer 110. A separate adhesive member may not be disposed between the sensor layer 120 and the display layer 110. As being in contact or "directly disposed," elements may form an interface therebetween without being limited thereto.

Alternatively, the sensor layer 120 and the display layer 110 may be bonded to each other through an adhesive member. The adhesive member may include a common adhesive or adhesive agent.

Referring to FIGS. 2, 4A, and 4B together, the upper functional layers may be disposed on the display panel 100. For example, the upper functional layers may include an anti-reflection member 200 and an upper member 300 as a stacked structure of upper layers.

The anti-reflection member 200 may be referred to as an anti-reflection layer. The anti-reflection member 200 may reduce the reflectance of external light incident from the outside. The anti-reflection member 200 may include a flexible synthetic resin film. For example, the anti-reflection member 200 may be provided by dyeing an iodine compound on a polyvinyl alcohol film (PVA film). However, this is an example, and the material constituting the anti-reflection member 200 is not limited the example.

The anti-reflection member 200 according to an embodiment may include color filters. The color filters may have a predetermined arrangement. In the anti-reflection member 200, the color filters may be arranged in consideration of emission colors of pixels included in the display layer 110. In addition, the anti-reflection layer may further include a black matrix adjacent to the color filters.

The anti-reflection member 200 according to an embodiment may include a destructive interference structure. For example, the destructive interference structure may include a first reflective layer and a second reflective layer that are disposed on different layers. First reflected light and second reflected light, which are reflected from the first reflective layer and the second reflective layer, respectively, may destructively interfere with each other, and the reflectance of external light may be reduced accordingly.

The anti-reflection member 200 may be bonded to the display panel 100 through a first panel adhesive layer 1010. The first panel adhesive layer 1010 may include a transparent adhesive material such as a pressure sensitive adhesive (PSA), an optically clear adhesive (OCA), or an optically clear resin (OCR). An adhesive layer described below may include a common adhesive or adhesive agent.

In an embodiment of the invention, the anti-reflection member 200 may be omitted. In this case, the first panel adhesive layer 1010 may also be omitted.

The upper member 300 may be disposed on the anti-reflection member 200. The upper member 300 may include a plurality of upper layers including a hard coating layer 310, a protective layer 320, a first upper adhesive layer 330, a window 340, a second upper adhesive layer 350, and a light-shielding pattern 360. The components included in the upper member 300 are not limited to the components listed above. At least some of the components listed above may be omitted, and other components may be added.

The hard coating layer 310 may be disposed on the uppermost portion of the display device 1000. The hard coating layer 310 may form an outer surface of the display device 1000, without being limited thereto. The hard coating layer 310 may be a functional layer for improving use characteristics of the display device 1000 and may be provided by being applied onto the protective layer 320. For example, the anti-fingerprint property, the anti-pollution property, the anti-scratch property, etc., may be improved due to the hard coating layer 310.

The protective layer 320 may be disposed below the hard coating layer 310. The protective layer 320 may protect components disposed below the protective layer 320. The hard coating layer 310, an anti-fingerprint layer, and the like may be additionally provided on the protective layer 320 so as to improve the properties such as chemical resistance and abrasion resistance. The protective layer 320 may include a film having an elastic modulus of about 15 gigapascals (GPa) or less at room temperature. In an embodiment, the protective layer 320 may be omitted. Although not specifically illustrated, the protective layer 320 may have a structure in which a plurality of films are stacked. The protective layer 320 may include a plurality of synthetic resin films bonded to each other through an adhesive.

The first upper adhesive layer 330 may be disposed below the protective layer 320. The protective layer 320 and the window 340 may be bonded to each other through the first upper adhesive layer 330.

The window 340 may be disposed below the first upper adhesive layer 330. The window 340 may include an optically transparent insulation material. For example, the window 340 may include a glass substrate or a synthetic resin film. When the window 340 is a glass substrate, the window 340 may be a thin film glass substrate having a thickness of about 80 micrometers (µm) or less. However, the thickness of the window 340 is not limited thereto.

When the window 340 is a synthetic resin film, the window 340 may include a polyimide (PI) film or a polyethylene terephthalate (PET) film.

The window 340 may have a multilayer structure or a single-layer structure. For example, the window 340 may include a plurality of synthetic resin films bonded to each other through an adhesive, or may include a glass substrate and a synthetic resin film bonded to each other through an adhesive.

The second upper adhesive layer 350 may be disposed below the window 340. The window 340 and the anti-reflection member 200 may be bonded to each other through the second upper adhesive layer 350.

In an embodiment of the invention, as related to outer side surfaces of various layers, a sidewall 340S of the window 340 and a sidewall 350S of the second upper adhesive layer 350 may each be disposed inward from sidewalls of other layers. As being "inward," a sidewall of side surface may be closer to the second region 1000A2 than another sidewall or another side surface, in a direction along the display device 1000 (or along the display panel 100) In an embodiment, for example, a sidewall 340S of the window 340 and a sidewall 350S of the second upper adhesive layer 350 may each be disposed inward from a sidewall 100S of the display panel 100 and a sidewall 320S of the protective layer 320. The "being disposed inward from" may mean being closer to the active region 1000A than other comparison objects.

The folding operation of the display device 1000 may change a positional relationship between the layers. According to an embodiment of the invention, since the sidewall 340S of the window 340 is disposed inward from the sidewall 100S of the display panel 100 and the sidewall 320S of the protective layer 320, the likelihood that the sidewall 340S of the window 340 will protrude from the sidewall 320S of the protective layer 320 may be reduced even when the positional relationship between the layers changes. Thus, the likelihood that an external impact will be delivered through the sidewall 340S of the window 340 may be reduced. As a result, the likelihood that cracks will occur in the window 340 may be reduced.

A first distance 340W between the sidewall 340S of the window 340 and the sidewall 320S of the protective layer 320 may be greater than or equal to a predetermined distance. Here, the first distance 340W may mean a distance in a direction parallel to the first direction DR1 along the plane. The first distance 340W may correspond to a distance between the sidewall 340S and the sidewall 320S on a plan view.

As the first distance 340W becomes greater, the protective layer 320 may protrude further than the window 340, and a portion of the protective layer 320 may be bent to be attached to other components, for example, a case, etc. As the area of the protective layer 320 becomes larger, the likelihood that foreign matters introduced from an upper portion of the protective layer 320 will be introduced into a lower portion of the protective layer 320 may be reduced.

A planar area of various components, layers, etc. may be defined along the plane defined by the first direction DR1 and the second direction DR2 crossing each other. The area (e.g., the planar area) of the second upper adhesive layer 350 may be smaller than the area of the window 340. In a process of attaching the window 340, pressure may be applied to the second upper adhesive layer 350. The second upper adhesive layer 350 may be pressured to extend in directions parallel to the first direction DR1 and the second direction DR2. Here, the area of the second upper adhesive layer 350 may be smaller than the area of the window 340 so as to prevent the second upper adhesive layer 350 from protruding further than the window 340.

When the first upper adhesive layer 330 and the second upper adhesive layer 350 are attached, the window 340 may fail to slip in the folding operation of the display device 1000 to cause buckling in the window 340. According to an embodiment of the invention, however, the area of the second upper adhesive layer 350 is smaller than the area of the window 340 and thus, the first upper adhesive layer 330 may be prevented from being attached to the second upper adhesive layer 350. In addition, the likelihood that foreign matters will adhere to the second upper adhesive layer 350 may be reduced.

A second distance 350W between the sidewall 350S of the second upper adhesive layer 350 and the sidewall 320S of the protective layer 320 may be greater than or equal to a predetermined distance. Here, the second distance 350W may mean a distance in a direction parallel to the first direction DR1. The second distance 350W may correspond to a distance between the sidewall 350S and the sidewall 320S on a plan view. The second distance 350W may be greater than the first distance 340W.

The light-shielding pattern 360 may be disposed below the protective layer 320. The light-shielding pattern 360 may be provided by being printed on a bottom surface of the protective layer 320, and may be covered by the first upper adhesive layer 330. The light-shielding pattern 360 may overlap the peripheral region 1000NA. The light-shielding pattern 360 may be disposed to be adjacent to the protective layer 320 and overlapping (or corresponding to) the peripheral region 1000NA. The light-shielding pattern 360 may be a colored layer, and may be formed using a coating method. The light-shielding pattern 360 may include a colored organic material or an opaque metal, but the materials constituting the light blocking layer 360 are not limited thereto.

FIG. 2 exemplarily illustrates that the light-shielding pattern 360 is disposed on and protruded from the bottom surface of the protective layer 320, where the bottom surface is closest to the display panel 100. However, the position of the light-shielding pattern 360 is not limited thereto. For example, the light-shielding pattern 360 may be provided on and protruded from a top surface of the protective layer 320, a top surface of the window 340, or a bottom surface of the window 340, where the top surface is opposite to the bottom surface and furthest from the display panel 100. The light-shielding pattern 360 may be provided in a plurality of layers. In this case, some of the light-shielding patterns 360 may be provided on the bottom surface of the protective layer 320, and others may be provided on the top surface of the protective layer 320, the top surface of the window 340, or the bottom surface of the window 340.

Although not illustrated, the upper member 300 may further include an impact absorption layer and a lower hard coating layer that are disposed below the second upper adhesive layer 350.

The impact absorption layer may be a functional layer for protecting the display panel 100 from an external impact. The impact absorption layer may be selected from films having an elastic modulus of about 1 gigapascal (GPa) or greater at room temperature. In an embodiment of the invention, the impact absorption layer may be omitted.

The lower hard coating layer may be provided on a surface of the impact absorption layer. The impact absorption layer may have an undulated surface. The impact absorption layer may have a top surface in contact with the second upper adhesive layer 350. Thus, undulations of the top surface of the impact absorption layer may be filled by the second upper adhesive layer 350 and thus, an optical issue may not occur on the top surface of the impact absorption layer. The impact absorption layer may have a bottom surface planarized by the lower hard coating layer. As the lower hard coating layer covers undulations of the bottom surface of the impact absorption layer, haze that may occur on the bottom surface of the impact absorption layer may be prevented.

The lower functional layers may be disposed below the display panel 100. For example, the lower functional layers may include a panel protection film 400, a first plate 600, a second plate 800, and a set member 1200 as a support layer. The components included in the lower functional layers are not limited to the components listed above. At least some of the components listed above may be omitted, and other components may be added.

The panel protection film 400 may be bonded to a rear surface of the display panel 100 through a second panel adhesive layer 1020. The panel protection film 400 may prevent scratches from occurring in the rear surface of the display panel 100 during a process of manufacturing (or providing) the display panel 100. The panel protection film 400 may be a polyimide (PI) film or a polyethylene terephthalate (PET) film. The panel protection film 400 may be a colored film. For example, the panel protection film 400 may be an opaque yellow film, but is not limited thereto.

The panel protection film 400 and the first plate 600 may be bonded to each other through an intermediate adhesive layer 500. The intermediate adhesive layer 500 may include a transparent adhesive such as a pressure sensitive adhesive (PSA), an optically clear adhesive (OCA), and optically clear adhesive resin (OCR). However, the type of the adhesive is not limited thereto.

In an embodiment, a first opening portion OP1 may be defined in the intermediate adhesive layer 500. Solid portions of the intermediate adhesive layer 500 may define the first opening portion OP1. The first opening portion OP1 may overlap (or correspond to) the second region 1000A2. Due to the first opening portion OP1, the intermediate adhesive layer 500 may overlap the first region 1000A1 and the third region 1000A3, and non-overlap the second region 1000A2. That is, the intermediate adhesive layer 500 may be disconnected or include portions which are spaced apart from each other at the second region 1000A2. Such portions are coplanar with each other along the plane. As non-overlapping, elements may be adjacent to each other in a direction along the plane and/or may be spaced apart from each other along the plane. As the intermediate adhesive layer 500 non-overlaps the second region 1000A2, the folding property of the intermediate adhesive layer 500 may be improved.

FIG. 2 illustrates that the intermediate adhesive layer 500 non-overlaps the second region 1000A2. However, an embodiment of the invention is not limited thereto. For example, the first opening portion OP1 may have a width decreasing in the first direction DR1 so that the intermediate adhesive layer 500 may overlap a portion of the second region 1000A2.

The first plate 600 may be disposed below the panel protection film 400. The strength of the first plate 600 may be greater than that of the display panel 100. The first plate 600 may be a component that supports components disposed thereon, for example, the display panel 100, etc.

For example, the first plate 600 may include a metal. The first plate 600 may include a single metal material or an alloy of multiple metal materials. For example, the first plate 600 may be stainless steel, aluminum, or an alloy thereof, or the like. The first plate 600 includes the metal so that the heat dissipation performance of the display panel 100 may be improved.

The first plate 600 may have a plate shape (e.g., a planar shape). For example, the first plate 600 may have a shape of a single body plate having a size corresponding to the display panel 100. As used herein, a size may refer to a planar size along the plane, without being limited thereto.

Referring to FIGS. 2 and 4A together, the first plate 600 included in the display device 1000 according to an embodiment may include a first non-folding region 610A1, a folding region 610A2, and a second non-folding region 610A3 that are arranged in the first direction DR1. The folding region 610A2 of the first plate 600 may overlap the second region 1000A2 of the active region 1000A of the display device 1000. At least a portion of the first non-folding region 610A1 of the first plate 600 may overlap the first region 1000A1 of the active region 1000A of the display device 1000, and at least a portion of the second non-folding region 610A3 may overlap the second region 1000A2 of the active region 1000A of the display device 1000. At least a portion of the first non-folding region 610A1 and the second non-folding region 610A3 may overlap the peripheral region 1000NA of the display device 1000.

The first plate 600 may further include a first portion 610-1 overlapping the first non-folding region 610A1, a second portion 610-2 overlapping the folding region 610A2, and a third portion 610-3 overlapping the second non-folding region 610A3. The first portion 610-1 and the third portion 610-3 may be referred to as a plate non-folding portion. The second portion 610-2 may be referred to as a plate folding portion.

A pattern 611 provided in plural including a plurality of patterns 611 may be defined in the first plate 600, at the second portion 610-2 thereof. The patterns 611 may overlap the second region 1000A2 of the active region 1000A of the display device 1000. The flexibility of the first plate 600 may increase due to the patterns 611. For example, the first plate 600 may be bendable or foldable at a portion including the patterns 611.

Each of the patterns 611 may be an opening pattern that passes through the first plate 600. However, the pattern 611 is not limited thereto, and may be a groove pattern recessed from one surface (top surface or bottom surface) of the first plate 600.

As illustrated FIG. 4B, the pattern 611 may have a quadrangular shape in a plan view (e.g., a planar shape) extending along the second region 1000A2 in the second direction DR2. However, the shape of the pattern 611 is not limited thereto, and the pattern 611 may have, for example, a rhombus shape, a circular shape or the like.

In an embodiment, as illustrated FIG. 4B, the patterns 611 may be provided in a plurality of rows each extending along the first direction DR1. The patterns 611 may be provided in a plurality of rows in a staggered arrangement where positions along the second direction DR2 are staggered.

FIGS. 2, 4A, and 4B exemplarily illustrate that the plurality of patterns 611 are defined in the second portion 610-2. In an embodiment, a thickness of the first plate 600 at the patterns 611 may be less than a thickness of the first plate 600 at locations except for the patterns 611. The pattern 611 may be otherwise referred to as a reduced-thickness pattern of the first plate 600. In an embodiment, within the second portion 610-2, solid portions (or full thickness portions) of the first plate 600 may be spaced apart from each other with the patterns 611 (or reduced-thickness portions) of the first plate 600 therebetween. The patterns 611 may include an enclosed planar shape, an open planar shape which open at an edge of the first plate 600, etc. Along the third direction DR3, the patterns 611 may penetrate completely through the thickness of the first plate 600 to be open at top and bottom surfaces thereof, or may be extended partially into the thickness of the first plate 600 to be open at one or both of the top and bottom surfaces of the first plate 600. A leftmost edge of the pattern and a rightmost edge of the pattern 611 along the first direction DR1 may correspond to a boundary between the second portion 610-2 and the plate non-folding region.

However, an embodiment of the invention is not limited thereto, and the patterns 611 may be defined on an entire surface of the second portion 610-2 in the form of a gap. That is, the first portion 610-1 corresponding to the first non-folding region 610A1 and the third portion 610-3 corresponding to the second non-folding region 610A3 may be included in the first plate 600, and the second portion 610-2 overlapping the folding region 610A2 may be omitted, so that the first portion 610-1 and the third portion 610-3 may be disconnected from each other to be spaced a predetermined gap from each other along the first direction DR1.

The lower functional layers may include a lower film 700 as a lower support layer which is disposed below the first plate 600. The lower film 700 may include a first lower adhesive layer 710 disposed below the first plate 600, a second lower adhesive layer 730 disposed above the second plate 800, and a high restoration layer 720 disposed between the first lower adhesive layer 710 and the second lower adhesive layer 730.

The first lower adhesive layer 710 and the high restoration layer 720 may each overlap the first non-folding region 610A1, the folding region 610A2, and the second non-folding region 610A3 of the first plate 600. The first lower adhesive layer 710 and the high restoration layer 720 may each overlap the second portion 610-2 of the first plate 600 on a plane to cover the plurality of patterns 611 defined in the second portion 610-2. Accordingly, the lower film 700 may prevent foreign matters from being introduced through the plurality of patterns 611 defined in the first plate 600.

The high restoration layer 720 may include a material having a high restoration force. The high restoration layer 720 may be otherwise referred to as a shape-restoring layer. In one example, the high restoration layer 720 according to an embodiment of the invention may include an elastomer. For example, the high restoration layer 720 may include polyurethane (PET), and specifically, may include thermoplastic polyurethane (TPU). When the high restoration layer 720 includes polyurethane, the high restoration layer 720 may have a thickness of about 5 μm to about 50 μm.

When the lower film 700 includes the high restoration layer 720, a restoration rate of the lower film 700 may increase even when the lower film 700 is deformed by a folding operation. Particularly, when the patterns 611 are provided in the folding region 610A2 of the first plate 600, the lower film 700 may penetrate to a side of the patterns 611 due to a folding stress in a folded state. However, when the lower film 700 includes the material having a high restoration force and the display device changes from the folded state to an unfolded state, the lower film 700 may be restored to a state before being deformed from the deformed state, in which the lower film 700 penetrates to the side of the patterns 611. Thus, the deformation of the patterns 611 provided in the first plate 600 may be reduced and accordingly, a phenomenon in which the patterns 611 are visible may be prevented and improved.

The high restoration layer 720 may be bonded to the first plate 600 through the first lower adhesive layer 710, and bonded to the second plate 800 through the second lower adhesive layer 730. The first lower adhesive layer 710 may be disposed on the entirety of a top surface of the high restoration layer 720. A second opening portion OP2 that exposes a portion of a bottom surface of the high restoration layer 720 to outside the lower film 700 may be defined in the second lower adhesive layer 730. The second opening portion OP2 may overlap the second region 1000A2. As the second plate 800 to be described later non-overlaps the second region 1000A2, the second opening portion OP2 overlapping the second region 1000A2 is defined also in the second lower adhesive layer 730 that bonds the high restoration layer 720 to the second plate 800.

The second opening portion OP2 defined in the second lower adhesive layer 730 may be understood as a groove defined in the lower film 700 which is open at a bottom surface of the lower film 700. That is, the second opening portion OP2 passing through the second lower adhesive layer 730 may be understood as a groove defined in a bottom surface of the lower film 700. The groove may pass through a thickness of the second lower adhesive layer 730 of the lower film 700.

In an embodiment of the invention, the lower film 700 includes the high restoration layer 720 having a high elastic modulus so that the lower film 700 may serve as a buffer film that absorbs an external impact.

The second plate 800 may be disposed below the lower film 700. The second plate 800 may include a first sub-plate 801 and a second sub-plate 802. The first sub-plate 801 may overlap the first region 1000A1 and overlap a portion of the second region 1000A2. The second sub-plate 802 may overlap the third region 1000A3 and overlap a portion of the second region 1000A2. A through-hole OP3 (as a first through-hole) overlapping a portion of the second region 1000A2 may be defined in (or by) the second plate 800. The through-hole OP3 may extend lengthwise in the second direction DR2, have a first width G1 in the first direction DR1 and have a depth along the third direction DR3. The through-hole OP3 may be in communication with the second opening portion OP2.

The second opening portion OP2 defined in the second lower adhesive layer 730 may lengthwise extend in the second direction DR2 and have a second width G2 in the first direction DR1. The second width G2 may be greater than the first width G1. Accordingly, the second lower adhesive layer 730 may expose one surface of each of the first sub-plate 801 and the second sub-plate 802. The second lower adhesive layer 730 may expose a top surface of each of the first sub-plate 801 and the second sub-plate 802 which is closest to the display panel 100, to outside the lower film 700. Each of the first width G1 and the second width G2 may be smaller than the width of the second region 1000A2 in the first direction DR1.

The first sub-plate 801 and the second sub-plate 802 may be disposed apart from each other in the first direction DR1, such that the second plate 800 may be disconnected at the second region 1000A2. The first sub-plate 801 and the second sub-plate 802 may be disposed as close to each other as possible, so as to support a region in which the patterns 611 of the first plate 600 are defined. For example, portions of the first sub-plate 801 and the second sub-plate 802 that overlap the second region 1000A2 may prevent the region, in which the patterns 611 of the first plate 600 are defined, from being deformed by pressure applied from an upper side.

The second plate 800 may serve to prevent the components, which are disposed above the second plate 800, from being deformed by the component such as the set member 1200, which is disposed below the second plate 800. Due to the second plate 800, the heat dissipation performance of the display panel 100 may be improved. The second plate 800 may also define a heat dissipation member or layer.

The second plate 800 may include a metal alloy. For example, the second plate 800 may include at least one of aluminum (Al), magnesium (Mg) and titanium (Ti). That is, the second plate 800 may include a relatively light metal (e.g., lightweight). However, the materials constituting the second plate 800 are not limited thereto.

An anti-corrosion layer 1100 may be disposed on at least one surface of the second plate 800. The anti-corrosion layer 1100 may include a metal and formed through, for example, plating. The anti-corrosion layer 1100 serves to prevent corrosion of the second plate 800 including the metal. In an embodiment of the invention, the anti-corrosion layer 1100 may be disposed only on some surfaces of the second plate 800, such as along a top surface and/or an inner side surface which is in the second region 1000A2. That is, the area to which the anti-corrosion layer 1100 as a first anti-corrosion layer is applied may be reduced when compared to the related art. This will be described later in detail.

The lower functional layers may further include an adhesive layer 900 disposed below the second plate 800. The adhesive layer 900 may be disposed between the second plate 800 and the set member 1200.

The adhesive layer 900 may be disposed on a bottom surface of the second plate 800, along an outer edge (or outer side surface) of the second plate 800. The adhesive layer 900 may be provided as an anti-corrosion liquid adhesive. The adhesive layer 900 as a second anti-corrosion layer may include at least one of an acrylic resin, a urethane-based resin and a silicone resin and thus, have an elasticity.

The adhesive layer 900 may be disposed in a closed curve shape so that the bottom surface of the second plate 800 that is surrounded by the adhesive layer 900 may be waterproofed. Specifically, the adhesive layer 900 may include a first sub-adhesive layer 901 disposed below the first sub-plate 801, and a second sub-adhesive layer 902 disposed below the second sub-plate 802. The first sub-adhesive layer 901 may be disposed in a closed curve shape along an edge of the first sub-plate 801, on a plane. The second sub-adhesive layer 902 may be disposed in a closed curve shape along an edge of the second sub-plate 802, on a plane. As the adhesive layer 900 is disposed along an edge of the second plate 800, adhesion between the second plate 800 and the set member 1200 is improved and it becomes difficult for external moisture to permeate to the bottom surface of the second plate 800 that is surrounded by the adhesive layer 900. Accordingly, the corrosion of the bottom surface of the second plate 800 may be prevented, and thus the bottom surface of the second plate 800 may not require a separate anti-corrosion layer.

The set member 1200 may be disposed below the second plate 800. The electronic modules, etc., included in the display device 1000 may be disposed on the set member 1200. The set member 1200 may further include a connection module. The connection module may include a hinge module, a polyarticular module or the like.

The set member 1200 may include a first set member 1201 and a second set member 1202. The first set member 1201 may overlap the first region 1000A1 and overlap a portion of the second region 1000A2. The second set member 1202 may overlap the third region 1000A3 and overlap a portion of the second region 1000A2. A second through-hole overlapping a portion of the second region 1000A2 may be defined in (or by) the set member 1200. The second through-hole may extend lengthwise in the second direction DR2, have a width in the first direction DR1 and have a depth along the third direction DR3. The second through-hole may be in communication with the first through-hole and the second opening portion OP2.

Although not illustrated, at least one hole, which overlaps each of the first sensing region 100SA1, the second sensing region 100SA2, and the third sensing region 100SA3 in FIG. 1A, may be defined in each of the first plate 600 and the second plate 800. The at least one hole may be defined also in the lower film 700. The at least one hole may be provided to overlap multiple regions among the first sensing region 100SA1, the second sensing region 100SA2, and the third sensing region 100SA3. Respective holes in the first plate 600, the second plate 800 and the lower film 700 may be aligned with each other, to provide a sensor hole at a sensing region. The external input to a sensing region may be transmitted through the sensor hole, such as to reach the electronic (functional) component.

Figure 5:
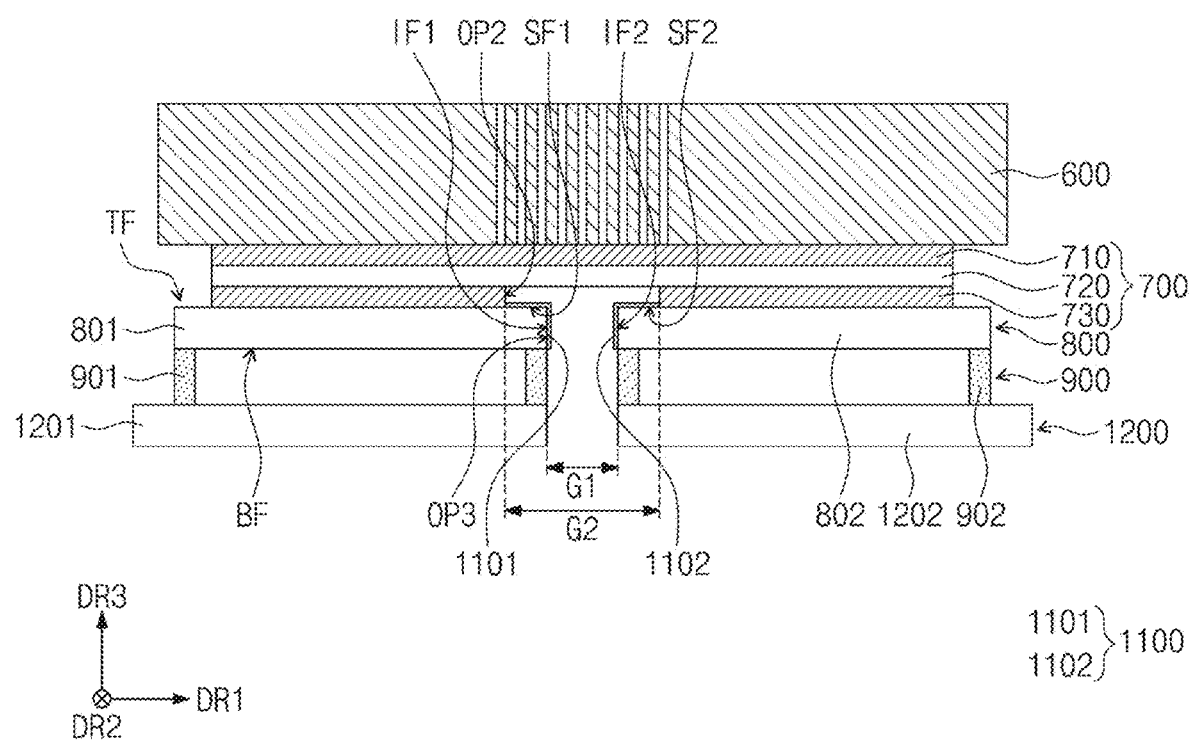
FIG. 5 is a cross-sectional view of some components of a display device according to an embodiment of the invention.

FIG. 5 is a cross-sectional view of some components of a display device 1000 according to an embodiment of the invention.

FIG. 5 illustrates a stacking relationship among the first plate 600, the lower film 700, the second plate 800, the adhesive layer 900, the anti-corrosion layer 1100, and the set member 1200 that are included in the lower functional layers among the components of the display device 1000 illustrated in FIG. 2.

Referring to FIG. 5, the first width G1 of the through-hole OP3 defined in the second plate 800 is smaller than the second width G2 of the second opening portion OP2 defined in the second lower adhesive layer 730. Accordingly, the second plate 800 has a top surface TF of which a first exposed surface SF1 and a second exposed surface SF2 (e.g., a first top surface portion and a second top surface portion) are exposed to outside the lower film 700, by the second opening portion OP2. The second plate 800 has a first inner side surface IF1 and a second inner side surface IF2 that are exposed to the outside. The first inner side surface IF1 may be an inner side surface of the first sub-plate 801, and the second inner side surface IF2 may be an inner side surface of the second sub-plate 802. The first inner side surface IF1 and the second inner side surface IF2 may face each other and together define the through-hole OP3. One or more of the first top surface portion, the second top surface portion, the first inner side surface IF1 and the second inner side surface IF2 may define an exposed surface or exposed portion of the second plate 800.

The anti-corrosion layer 1100 may be disposed on at least one surface (e.g., an exposed surface) of the second plate 800 so as to prevent the corrosion of the second plate 800. For example, the anti-corrosion layer 1100 may cover the first exposed surface SF1, the second exposed surface SF2, the first inner side surface IF1, and the second inner side surface IF2. The anti-corrosion layer 1100 may be in the through-hole OP3 and extend out of the through-hole OP3, to extend along portions of the top surface TF which are adjacent to the inner side surfaces.

The anti-corrosion layer 1100 may include a first anti-corrosion layer 1101 disposed on the first sub-plate 801, and a second anti-corrosion layer 1102 disposed on the second sub-plate 802. The first anti-corrosion layer 1101 may cover the first exposed surface SF1 and the first inner side surface IF1. The first anti-corrosion layer 1101 may extend lengthwise in the second direction DR2, have a width in the first direction DR1 and have a height along the third direction DR3. The first anti-corrosion layer 1101 may have an integrated shape. That is, the first anti-corrosion layer 1101 may extend along the first exposed surface SF1 and may further extend from the first exposed surface SF1 to cover the first inner side surface IF1.

Similarly, the second anti-corrosion layer 1102 may cover the second exposed surface SF2 and the second inner side surface IF2. The second anti-corrosion layer 1102 may have an integrated shape. That is, the second anti-corrosion layer 1102 may extend along the second exposed surface SF2 and may further extend from the second exposed surface SF2 to cover the second inner side surface IF2.

The anti-corrosion layer 1100 may not be disposed on a bottom surface BF of the second plate 800. Since the adhesive layer 900 is disposed on the bottom surface BF of the second plate 800 along the edge of the second plate 800, the bottom surface BF of the second plate 800 may be waterproofed. For example, considering the planar area of the second plate 800 in which the adhesive layer 900 is disposed, about 95% or greater of the planar area of the bottom surface BF of the second plate 800 may be waterproofed. Accordingly, the anti-corrosion layer 1100 needs not to be disposed on the bottom surface BF of the second plate 800 and may be excluded therefrom, and the planar area of the anti-corrosion layer 1100 applied to the second plate 800 may be reduced.

Figure 6A:
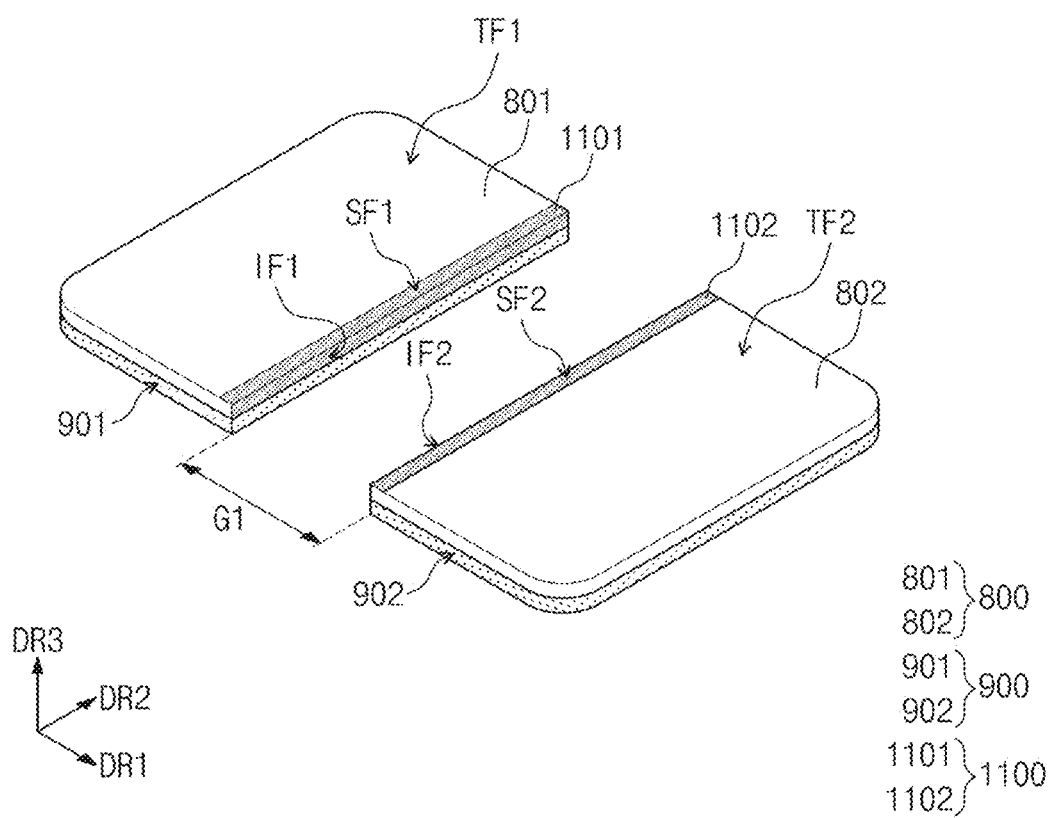
FIG. 6A is a perspective view of some components of a display device according to an embodiment of the invention.
Figure 6B:
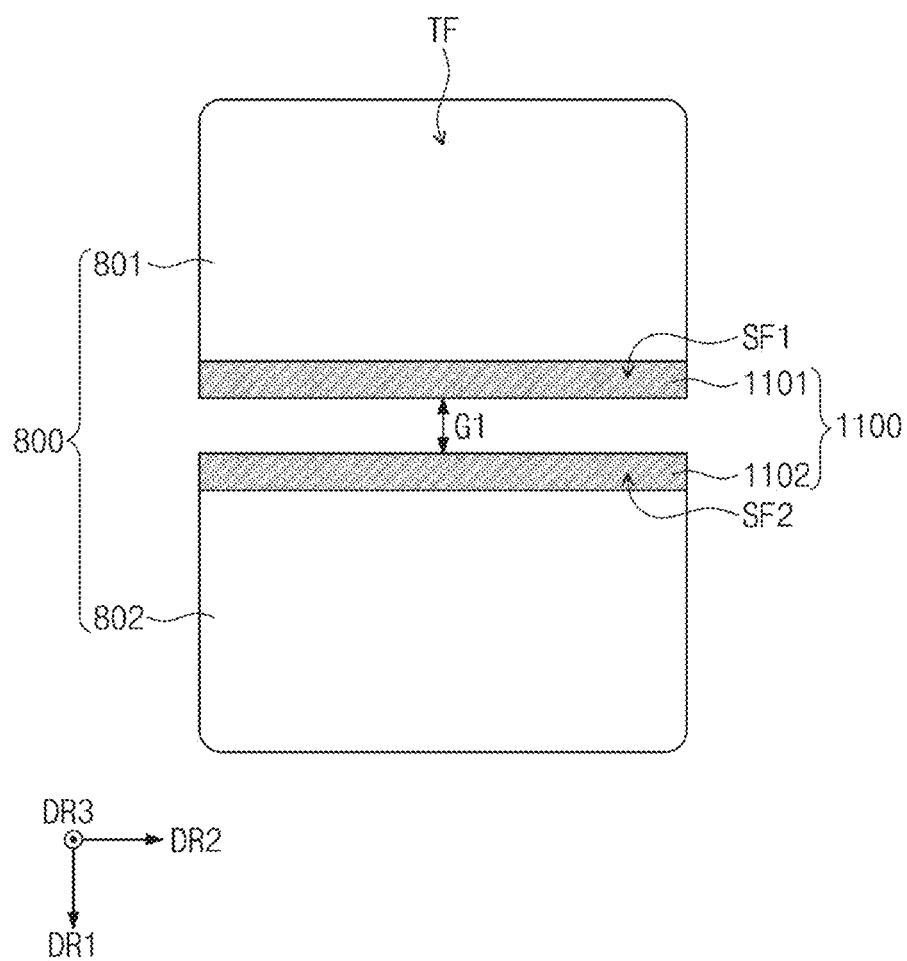
FIG. 6B is a plan view of some components of a display device according to an embodiment of the invention.
Figure 6C:
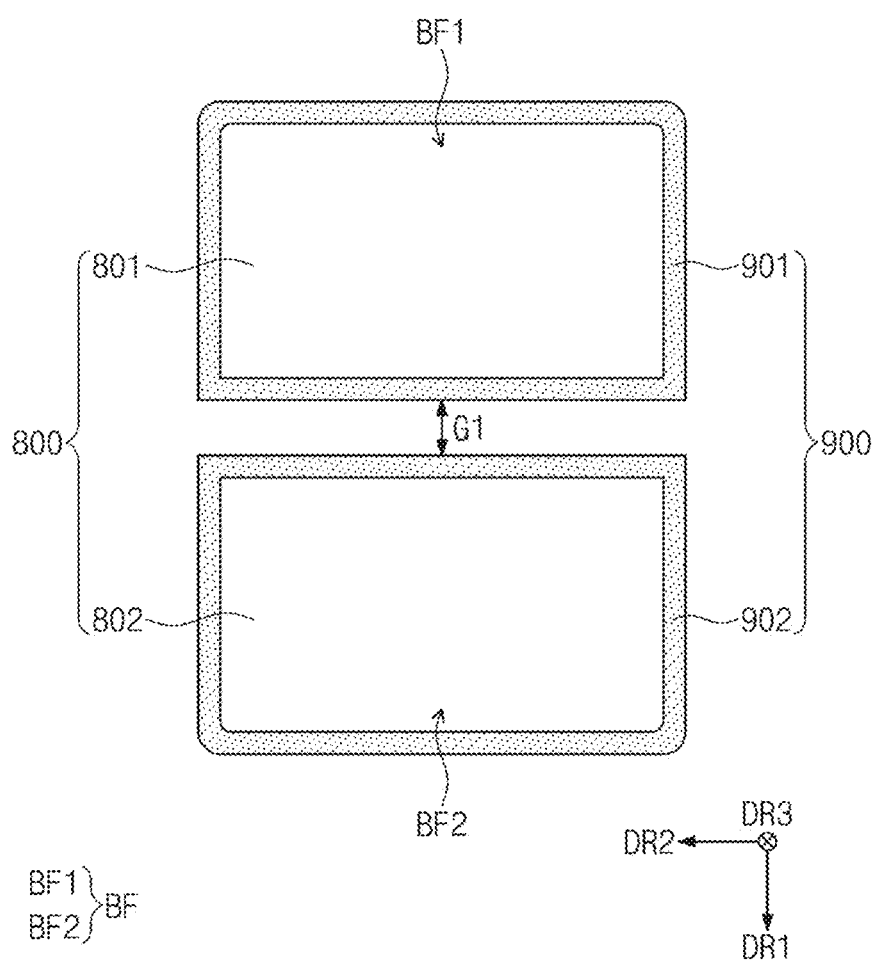
FIG. 6C is a plan view of some components a display device according to an embodiment of the invention.
Figure 7:
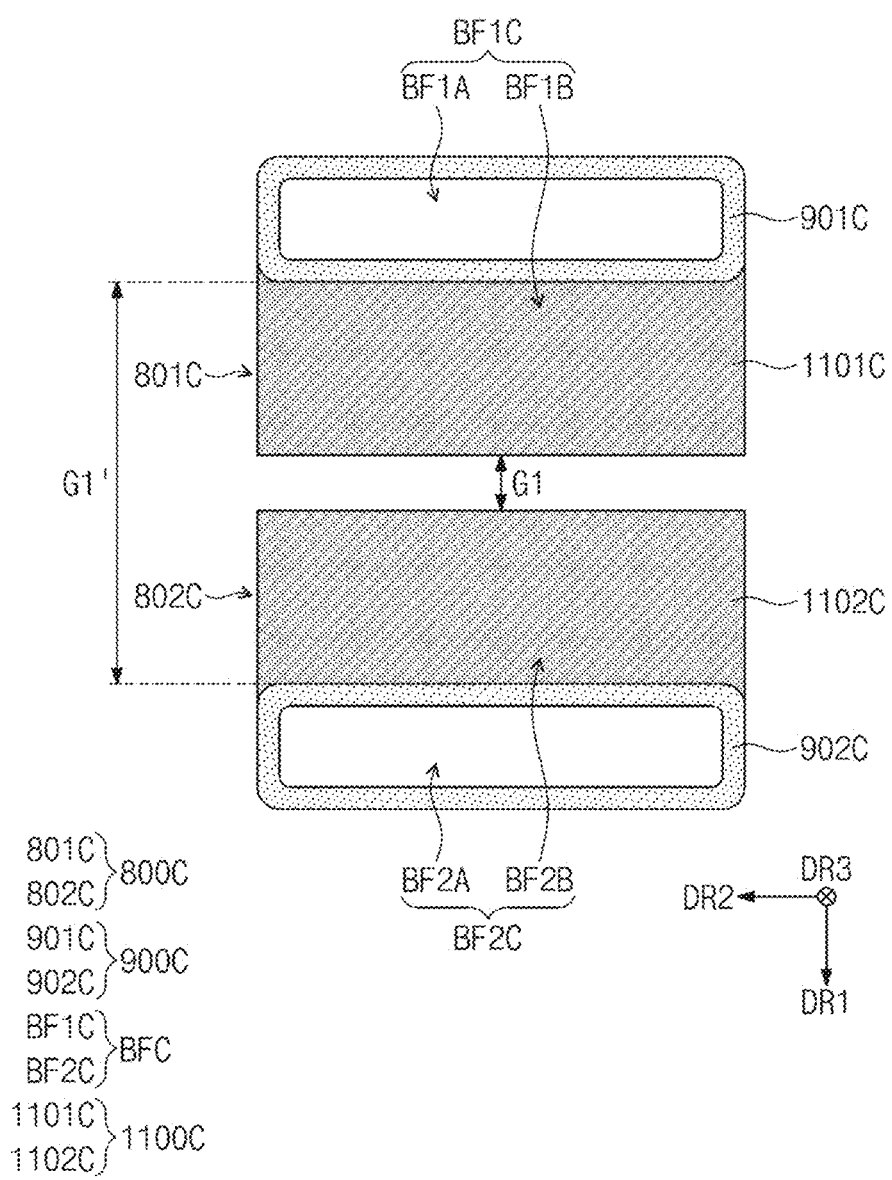
FIG. 7 is a plan view of some components of a display device according to Comparative Example.

FIG. 6A is a perspective view of some components of a display device 1000 according to an embodiment of the invention. FIG. 6B is a plan view of some components of a display device 1000 according to an embodiment of the invention. FIG. 6C is a plan view of some components a display device 1000 according to an embodiment of the invention. FIG. 7 is a plan view of some components of a comparative display device according to Comparative Example.

FIGS. 6A to 6C each illustrate an arrangement relationship among a second plate 800, an adhesive layer 900, and an anti-corrosion layer 1100 according to an embodiment. FIG. 7 illustrates an arrangement relationship among a second plate 800, an adhesive layer 900, and an anti-corrosion layer 1100 according to Comparative Example.

Referring to FIGS. 6A to 6C, the second plate 800 includes a first sub-plate 801 and a second sub-plate 802 that are spaced apart from each other by a first width G1 from each other in a first direction DR1. The second plate 800 may include at least one of aluminum (Al), magnesium (Mg) and titanium (Ti). That is, the second plate 800 may include a light metal.

The first sub-plate 801 has a first top surface TF1 and a first inner side surface IF1 which extends from the first top surface TF1. The second sub-plate 802 has a second top surface TF2 and a second inner side surface IF2 which extends from the second top surface TF2. The first inner side surface IF1 and the second inner side surface IF2 may face each other with a gap having the first width G1 therebetween.

The anti-corrosion layer 1100 may be disposed on at least one exposed surface of the second plate 800 to prevent corrosion of the second plate 800 at the exposed surface. The anti-corrosion layer 1100 may be in contact with the at least one exposed surface of the second plate 800.

The anti-corrosion layer 1100 may include a first anti-corrosion layer 1101 that covers an exposed surface portion of the first sub-plate 801, and a second anti-corrosion layer 1102 that covers an exposed surface portion of the second sub-plate 802. The first anti-corrosion layer 1101 is disposed on the first inner side surface IF1 and a first exposed surface SF1. The second anti-corrosion layer 1102 is disposed on the second inner side surface IF2 and a second exposed surface SF2.

The anti-corrosion layer 1100 may not be disposed on the bottom surface BF of the second plate 800. A bottom end of the anti-corrosion layer 1100 may coincide with or be aligned with the bottom surface BF of the second plate 800. Since the adhesive layer 900 is disposed on the bottom surface BF of the second plate 800, along an edge of the bottom surface BF of the second plate 800, the anti-corrosion layer 1100 may be unnecessary along the bottom surface BF.

The adhesive layer 900 may be provided in a preliminary form of liquid on the bottom surface BF of the second plate 800, and finally-formed by curing such material. The adhesive layer 900 may include at least one of an acrylic resin, a urethane-based resin and a silicone resin. The adhesive layer 900 may have an elasticity by including the materials and satisfying a predetermined thickness range to. For example, the adhesive layer 900 may have a thickness of about 10 μm to about 300 μm along the third direction DR3.

The adhesive layer 900 may include a first sub-adhesive layer 901 disposed on a first bottom surface BF1 of the first sub-plate 801, and a second sub-adhesive layer 902 disposed on a second bottom surface BF2 of the second sub-plate 802. The first sub-adhesive layer 901 may be disposed along an outer edge of the first bottom surface BF1 of the first sub-plate 801 and have a closed curve shape. The second sub-adhesive layer 902 may be disposed along an outer edge of the second bottom surface BF2 of the second sub-plate 802 and have a closed curve shape. Accordingly, a distance between the inner surface of the first sub-adhesive layer 901 and the inner surface of the second sub-adhesive layer 902 in the first direction DR1 is substantially the same as the first width G1.

As the first and second sub-adhesive layers 901 and 902 each has a closed curve shape along the bottom surface BF, the permeation of external moisture to the first and second bottom surfaces BF1 and BF2 may be prevented and improved.

Referring to FIG. 7, a second plate 800C according to Comparative Example may include an alloy such as SUS304. That is, the second plate 800C may have a greater weight than the second plate 800 illustrated FIGS. 6A to 6C.

As illustrated, an adhesive layer 900C according to Comparative Example may surround only a portion of a bottom surface BFC of the second plate 800C. A first sub-adhesive layer 901C may be disposed close to an upper end of a first sub-plate 801C to surround only a portion BF1A of a first bottom surface BF1C. A second sub-adhesive layer 902C may be disposed close to a lower end of a second sub-plate 802C to surround only a portion BF2A of a second bottom surface BF2C. A distance G1' between the first sub-adhesive layer 901C and the second sub-adhesive layer 902C becomes greater than the first width G1 between the sub-plates.

In the bottom surface BFC the second plate 800C, a first exposed portion BF1B, which is not surrounded by the first sub-adhesive layer 901C, and a second exposed portion BF2B, which is not surrounded by the second sub-adhesive layer 902C, may not be waterproofed and thus subject to corrosion or being corroded. Accordingly, an anti-corrosion layer 1100C may be disposed below each of the first exposed portion BF1B and the second exposed portion BF2B. A first anti-corrosion layer 1101C may be disposed below the first exposed portion BF1B, and a second anti-corrosion layer 1102C may be disposed below the second exposed portion BF2B. An anti-corrosion layer is disposed on each of a top surface and an inner side surface of the second plate 800C as illustrated in FIGS. 6A to 6C. Thus, the area of the anti-corrosion layer 1100C disposed on the second plate 800C, and the weight of the anti-corrosion layer 1100C increase.

Referring to FIGS. 6A to 6C and 7 together, the adhesive layer 900 is disposed on an upper portion of the second plate 800 according to an embodiment of the invention along the edge of the second plate 800, so that the bottom surface BF of the second plate 800 may be waterproofed. Accordingly, the anti-corrosion layer 1100 may not be applied to the bottom surface BF of the second plate 800, and manufacturing costs of the anti-corrosion layer 1100 may be reduced. In addition, the weight of an upper structure supported by the adhesive layer 900 may be reduced.

Figure 8A:
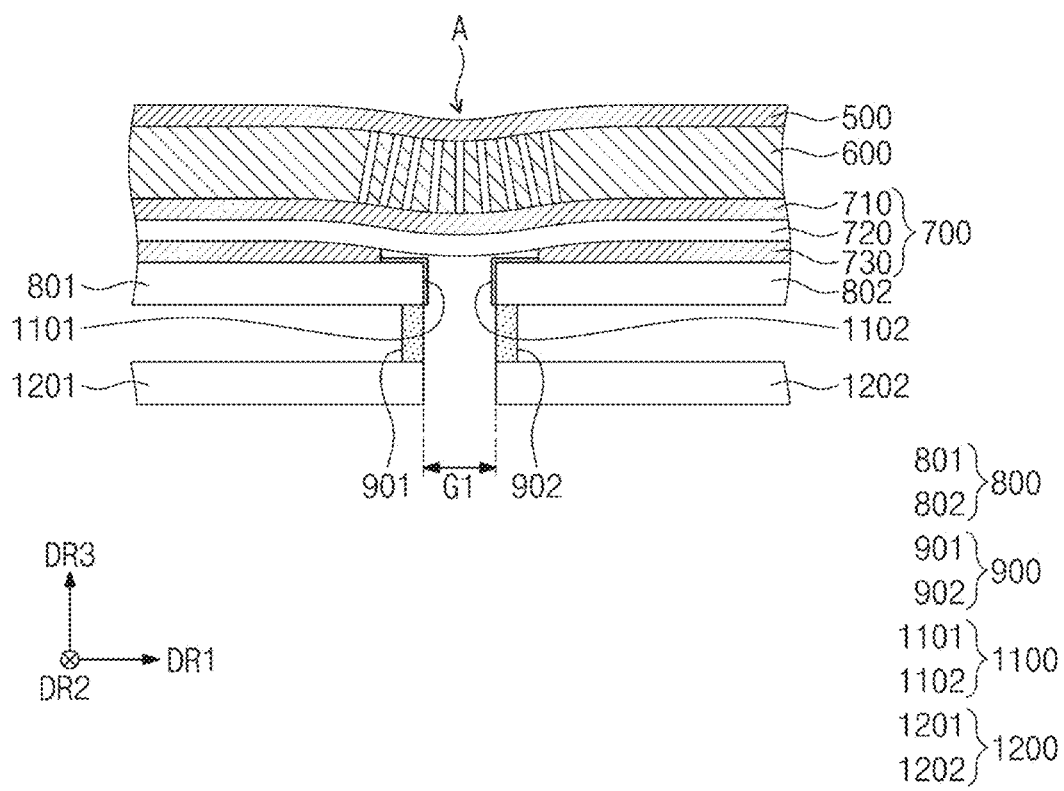
FIG. 8A is a cross-sectional view of a display device having a partially modified component according to an embodiment of the invention.
Figure 8B:
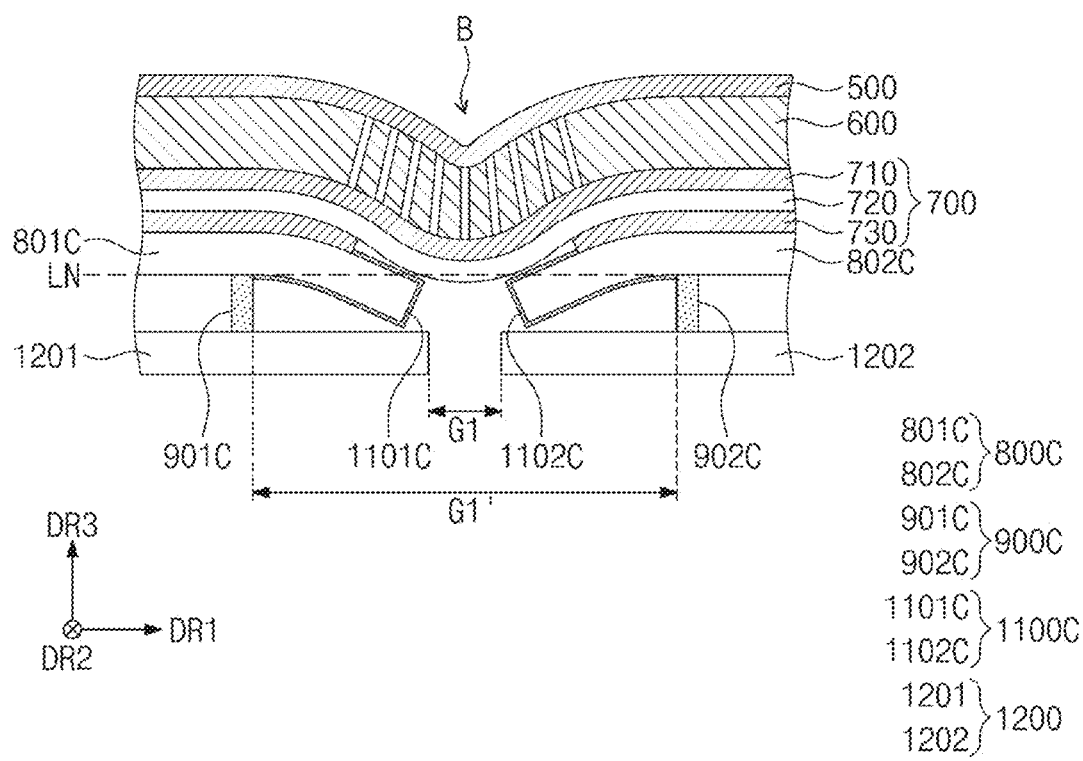
FIG. 8B is a cross-sectional view of a display device having a partially modified component according to Comparative Example.

FIG. 8A is a cross-sectional view of a display device 1000 having a partially modified component according to an embodiment of the invention. FIG. 8B is a cross-sectional view of a comparative display device having a partially modified component according to Comparative Example.

FIG. 8A includes the second plate 800, the adhesive layer 900, and the anti-corrosion layer 1100 that are described above with reference to FIGS. 6A to 6C. FIG. 8B includes the second plate 800C, the adhesive layer 900C, and the anti-corrosion layer 1100C that are described above with reference to FIG. 7.

For convenience of explanation, FIGS. 8A and 8B simply illustrate only an intermediate adhesive layer 500, a first plate 600, a lower film 700, a second plate 800, an adhesive layer 900, an anti-corrosion layer 1100, and a set member 1200 among components of a display device 1000 according to an embodiment of the invention. The other components are omitted.

Referring to FIG. 8A, since the second plate 800 according to an embodiment of the invention includes a light metal and the adhesive layer 900 is disposed along an edge of the second plate 800, sagging of the second plate 800 may be prevented during the folding operation. In particular, a first sub-adhesive layer 901 and a second sub-adhesive layer 902 are disposed as close to each other as possible with a first width G1 therebetween so that a portion of the second plate 800, which overlaps a folding region A, may be stably supported. Since the second plate 800 is not deformed during the folding operation, deformation according to the folding may also be minimized on the lower film 700, the first plate 600, and the intermediate adhesive layer 500 that are disposed above the second plate 800.

Referring to FIG. 8B, the second plate 800C according to Comparative Example includes a metal heavier than that of the second plate 800, and the adhesive layer 900C is disposed only along a portion of the second plate 800C. Accordingly, the second plate 800C may sag downward due to the folding operation when compared to the second plate 800 in FIG. 8A.

In particular, as a distance G1' between a first sub-adhesive layer 901C and a second sub-adhesive layer 902C becomes greater than the first width G1, the second plate 800C may sag toward a space between the first sub-adhesive layer 901C and the second sub-adhesive layer 902C. For example, the second plate 800C may sag downward from a reference line LN parallel to a top surface of the adhesive layer 900C. As the second plate 800C sags, the degree of deformation of each of the lower film 700, the first plate 600, and the intermediate adhesive layer 500, which are disposed above the second plate 800C and overlap a comparative folding region B, increases during the folding operation. This may affect deformation of the display panel 100 (see FIG. 2) overlapping the comparative folding region B.

Specifically, when the folding operation of the display device 1000 is repeated or performed for a long time period, the portion overlapping the folding area A may be deformed by a reaction force of substances included in the display panel 100, etc. In particular, in the case of the display device 1000 that executes the in-folding operation, the deformation such as sagging of the display panel 100, may occur in a direction toward a bottom surface opposing a top surface in which a folding axis FX is defined.

In an embodiment of the invention, the adhesive layer 900 may be disposed below the second plate 800 along the edge of the second plate 800 so that the effect that the adhesive layer 900 supports the second plate 800 may be improved. In addition, the second plate 800 may include the light metal such as Al, Mg, and Ti, and the anti-corrosion layer 1100 may not be disposed on the bottom surface of the second plate 800, so that the effect that the adhesive layer 900 supports the second plate 800 may be further improved. Accordingly, the deformation of the second plate 800 according to the folding operation may be prevented, and the amount of deformation according to the folding operation may be reduced on the first plate 600 and the display panel 100 that are disposed above the second plate 800. Thus, the folding reliability of the display device 1000 according to an embodiment of the invention may be improved.

According to an embodiment of the invention, a support plate disposed below the display panel 100 is dually provided as the first plate 600 and the second plate which is disposed below the first plate 600. The deformation of the second plate 800 may be prevented to improve the effects of supporting the first plate 600 and the panel. In particular, the effects of supporting the first plate 600 and the folding area A of the panel may be improved to improve the folding property of the display device 1000.

Although the embodiments of the invention have been described, it is understood that the invention should not be limited to these embodiments but various changes and modifications can be made by one ordinary skilled in the art within the spirit and scope of the present invention as hereinafter claimed. Therefore, the technical scope of the invention is not limited to the contents described in the detailed description of the specification, but should be determined by the claims.

What is claimed is:

1. A display device comprising:
    a display panel including a folding region and a non-folding region which is adjacent to the folding region along a first direction;
    a first plate facing the display panel;
    a second plate facing the non-folding region of the display panel with the first plate therebetween, the second plate including:
        a first sub-plate and a second sub-plate spaced apart from each other along the first direction, at the folding region, and
        each of the first sub-plate and the second sub-plate including an outer edge;
    an adhesive layer protruded from the second plate, in a direction away from the first plate, the adhesive layer including:
        a first sub-adhesive layer extended along the outer edge of the first sub-plate, and
        a second sub-adhesive layer extended along the outer edge of the second sub-plate; and
    an anti-corrosion layer which extends along the outer edge of the first sub-plate and the second sub-plate, and overlaps the first sub-adhesive layer and the second sub-adhesive layer, respectively.

2. The display device of claim 1, wherein the first sub-adhesive layer and the second sub-adhesive layer each have a closed curve shape.

3. The display device of claim 1, wherein the adhesive layer comprises at least one of an acrylic resin, a urethane-based resin and a silicone resin.

4. The display device of claim 1, wherein the second plate comprises at least one of aluminum, magnesium and titanium.

5. The display device of claim 1, wherein within the second plate, the first sub-plate and the second sub-plate are spaced apart from each other by a first width along in the first direction.

6. The display device of claim 5, wherein
    the folding region of the display panel has a width along the first direction, and
    the first width by which the first sub-plate and the second sub-plate are spaced apart from each other is smaller than the width of the folding region.

7. The display device of claim 1, wherein the first plate comprises a pattern corresponding to the folding region of the display panel.

8. The display device of claim 1, further comprising:
    a lower adhesive layer which is between the first plate and the second plate, and
    an opening which is defined in the lower adhesive layer and corresponds to the folding region of the display panel
    wherein the anti-corrosion layer is coplanar with the lower adhesive layer.

9. The display device of claim 8, further comprising a shape-restoring layer which includes an elastomer and is between the first plate and the lower adhesive layer.

10. The display device of claim 8, wherein
    each of the first sub-plate and the second sub-plate has a top surface which is closest to the first plate, and
    the lower adhesive layer contacts the top surface of the first sub-plate and the top surface of the second sub-plate.

11. The display device of claim 10, wherein:
    the top surface of the first sub-plate includes a first exposed surface exposed from the lower adhesive layer at the opening which is defined in the lower adhesive layer; and
    the top surface of the second sub-plate includes a second exposed surface exposed from the lower adhesive layer at the opening which is defined in the lower adhesive layer.

12. The display device of claim 11, wherein the anti-corrosion layer covers the first exposed surface and the second exposed surface of the second plate.

13. The display device of claim 12, wherein:
the first sub-plate further includes a first inner side surface;
the second sub-plate further includes a second inner side surface facing the first inner side surface along the first direction, at the folding region; and
the anti-corrosion layer respectively extends from the first exposed surface and the second exposed surface of the second plate, and along the first inner side surface and the second inner side surface.

14. The display device of claim 1, further comprising:
a support layer facing the first sub-plate and the second sub-plate of the second plate, and
the adhesive layer which is protruded from the second plate being between the second plate and the support layer and in contact with the support layer.

15. A display device comprising:
a display panel including a folding region and a non-folding region which is adjacent to the folding region along a first direction;
a first plate facing the display panel;
a second plate facing the non-folding region of the display panel with the first plate therebetween, the second plate comprising a top surface which is closest to the first plate;
a through-hole defined in the second plate and corresponding to the folding region of the display panel;
a lower support layer which is between the first plate and the second plate and contacts the top surface of the second plate;
a groove which is defined in the lower support layer, corresponds to the folding region of the display panel, and exposes a portion of the top surface of the second plate from the lower support layer; and
an anti-corrosion layer which is between the second plate and the lower support layer and covers the portion of the top surface of the second plate which is exposed by the groove.

16. The display device of claim 15, wherein:
the through-hole which is defined in the second plate has a first width along the first direction; and
the groove which is defined in the lower support layer has a second width along the first direction which is greater than the first width.

17. The display device of claim 15, further comprising a pattern corresponding to the folding region of the display panel, defined in the first plate.

18. The display device of claim 15, wherein the lower support layer couples the first plate and the second plate to each other.

19. The display device of claim 15, wherein the lower support layer comprises:
a first lower adhesive layer in contact with the first plate;
a second lower adhesive layer which is in contact with the second plate; and
a shape-restoring layer which includes an elastomer and is between the first lower adhesive layer and the second lower adhesive layer; and
the groove is defined by the second lower adhesive layer together with the shape-restoring layer.

20. The display device of claim 15, further comprising an adhesive layer which is in contact with and protruded from the second plate, in a direction away from the first plate, the adhesive layer extended along an outer edge of the second plate.

21. The display device of claim 20, wherein:
the second plate further comprises:
a first sub-plate and a second sub-plate spaced apart from each other along the first direction, at the folding region of the display panel,
each of the first sub-plate and the second sub-plate defining the outer edge, and
the through-hole defined between the first sub-plate and the second sub-plate; and
the adhesive layer comprises:
a first sub-adhesive layer extended along the outer edge at the first sub-plate and having a closed curve shape, and
a second sub-adhesive layer extended along the outer edge at the second sub-plate and having a closed curve shape.

22. The display device of claim 21, wherein:
the second plate further comprises the top surface at the first sub-plate and at the second sub-plate;
the first sub-plate includes a first inner side surface which is extended from the top surface at the first sub-plate and with which the through-hole is defined;
the second sub-plate includes a second inner side surface which is extended from the top surface at the second sub-plate, faces the first inner side surface, and with which the through-hole is defined together with the first inner side surface; and
the anti-corrosion layer respectively extends from the top surfaces of the first sub-plate and the second sub-plate, and along the first inner side surface and the second inner side surface.

23. The display device of claim 20, wherein the adhesive layer comprises at least one of an acrylic resin, a urethane-based resin and a silicone resin.

24. The display device of claim 15, wherein the second plate further comprises at least one of aluminum, magnesium and titanium.

25. An electronic device comprising:
a display panel including a folding region;
a first plate facing the display panel, the first plate including a pattern which corresponds to the folding region of the display panel;
a second plate which faces the display panel with the first plate therebetween, the second plate comprising:
an outer edge,
a top surface which is closest to the first plate, and
an inner side surface which extends from the top surface and defines a through-hole of the second plate, the through hole corresponding to the folding region of the display panel;
an anti-corrosion layer which extends along the outer edge of the first sub-plate and the second sub-plate, and overlaps the first sub-adhesive layer and the second sub-adhesive layer, respectively, and
an adhesive layer protruded from the second plate, in a direction away from the first plate, the adhesive layer extending along the outer edge of the second plate.

26. The electronic device of claim 25, wherein
the second plate further includes a bottom surface which is opposite to the top surface, and
the anti-corrosion layer is excluded from the bottom surface of the second plate.

27. The electronic device of claim 25, wherein the second plate comprises at least one of aluminum, magnesium and titanium.

* * * * *